United States Patent [19]

Maria

[11] Patent Number: 4,859,133

[45] Date of Patent: Aug. 22, 1989

[54] FORK LIFT TRUCK AND VEHICLE FOR THE TRANSPORT THEREOF

[76] Inventor: Jozef G. Maria, Langstraat 74, 5801 AE Venray, Netherlands

[21] Appl. No.: 54,548

[22] Filed: May 27, 1987

[30] Foreign Application Priority Data

May 28, 1986 [NL] Netherlands ........................ 8601358

[51] Int. Cl.[4] ............................ B60P 3/06; B66F 9/08

[52] U.S. Cl. .................................... 414/462; 212/198; 280/758; 414/467; 414/636; 414/673

[58] Field of Search ................................ 414/630-636, 414/341, 467, 673, 462, 463, 641, 642, 498, 347; 280/758, 759; 212/196-198, 182, 185

[56] References Cited

U.S. PATENT DOCUMENTS

| | | | |
|---|---|---|---|
| 2,707,063 | 4/1955 | Gran et al. | 414/632 |
| 3,375,947 | 4/1968 | Kissilov | 414/467 |
| 3,407,950 | 10/1968 | Ward et al. | 414/462 |
| 3,441,158 | 4/1969 | Wilson | 414/632 |
| 3,710,965 | 1/1973 | Joosten | 414/467 |
| 3,734,326 | 5/1973 | Esser | 414/673 X |
| 3,741,604 | 6/1973 | Heath | 414/470 |
| 4,435,113 | 3/1984 | Mosely et al. | 414/347 |

FOREIGN PATENT DOCUMENTS

| | | | |
|---|---|---|---|
| 1580265 | 7/1970 | Fed. Rep. of Germany . | |
| 2359418 | 6/1975 | Fed. Rep. of Germany . | |
| 1154723 | 4/1958 | France | 212/196 |
| 8005192 | 4/1982 | Netherlands . | |
| 1548555 | 7/1979 | United Kingdom | 414/673 |
| 2014946 | 9/1979 | United Kingdom . | |
| 8201363 | 4/1982 | World Int. Prop. O. . | |

*Primary Examiner*—David A. Bucci
*Attorney, Agent, or Firm*—Pennie & Edmonds

[57] ABSTRACT

Fork lift truck comprising a chassis, a front and a rear axle supported by the chassis and having wheels at their outer ends, a portal which is pivotally connected to the front of the chassis, a fork, on which a load can be placed, being movable along said portal, an engine which is provided on the chassis for driving wheels of the fork lift truck, said truck being intended for being transported under the loading floor of a vehicle intended for goods carriage. A counterweight is provided outside the wheelbase at the end of the chassis located opposite the portal, whilst the portal is pivotally connected to the chassis in such a manner that the portal can be folded down over the engine and the counterweight against the upper side of the chassis. A vehicle arranged for transport of the fork lift truck has a space under the loading floor in which the fork lift truck can be transported in folded condition and which is provided with rails extending transversely to the longitudinal direction of the vehicle, in which rails the wheels of the fork lift truck can be guided.

14 Claims, 3 Drawing Sheets

FORK LIFT TRUCK AND VEHICLE FOR THE TRANSPORT THEREOF

The invention relates to a fork lift truck comprising a chassis, a front and a rear axle supported by the chassis and having wheels at their outer ends, a portal which is pivotally connected to the front of the chassis, a fork, on which a load can be placed, being movable along said portal, an engine which is provided on the chassis for driving wheels of the fork lift truck, said truck being intended for being transported under the loading floor of a vehicle intended for goods carriage.

Such a fork lift truck is known i.a. from the US patent specification 3,375,947. In order to make it possible for this known fork lift truck to be transported in folded condition the portal, which is pivotally connected to the chassis, is slid together and stowed away under the chassis, which requires complicated provisions.

The purpose of the invention is to provide a fork lift truck with a construction as compact and light as possible, adapted to the universal international chassis dimensions of lorries and the like in order to place the fork lift truck under a lorry or semi-trailer or trailer with the lowest possible mounting height, with the largest possible ground clearance, therefore.

For this purpose a fork lift truck of the kind mentioned in the preamble is characterized according to the invention in that a counterweight is provided outside the wheelbase at the end of the chassis located opposite the portal and the portal is pivotally connected to the chassis in such a manner that the portal can be folded down, over the engine and the counterweight, against the upper side of the chassis. By providing the counterweight outside the wheelbase a more compact construction is obtained, as the end-to-end length and the wheel distance can be relatively short, whilst by folding down the portal against the upper side of the chassis a considerably simpler construction is obtained, which can easily be carried along in transverse position. In order to influence the loading capacity of the truck as little as possible the deadweight of the fork lift truck should be as low as possible. Therefore the construction is based on a small counterweight which can be moved rearwardly for adding to the stability.

It is noted that from the US patent specification 3,710,965 a fork lift truck having a movable counterweight is known by itself. Said counterweight, however, is located inside the wheelbase, which for that matter is the only possibility, in view of the chain drive for the counterweight.

When the fork lift truck according to the invention is transported by a vehicle with the portal in folded condition, the lift fork may be located along the side of the vehicle or the lift fork of the portal may be constructed detachably.

As the truck according to the invention will mainly be used in those cases where large distances between the lorry and the warehouse have to be bridged and bad terrain conditions are usually present a suitable embodiment of a fork lift truck according to the invention is characterized in that the front axle of the fork lift truck is driven by the engine and the diameter of the wheels mounted on the front axle is larger than the diameter of the wheels mounted on the front axle, as a result of which a better traction for badly negotiable terrains is obtained and the stability is increased. Also for increasing the stability it is advantageous when the non-driven rear axle is adjustable parallel to itself.

The invention also relates to a vehicle for goods carriage, such as a lorry, a trailer for such a lorry, an articulated vehicle and the like, said vehicle being arranged for transporting a fork lift truck as described hereinabove, whereby a space is present under the loading floor in which space the fork lift truck can be transported in folded condition, as is known e.g. from the US patent specification 3,375,947 already mentioned before.

According to the invention a vehicle of this kind is characterized in that the vehicle is provided with rails extending transversely to the longitudinal direction of the vehicle, in which rails the wheels of the fork lift truck can be guided, said rails either being vertically adjustable so that the fork lift truck can be taken up when the rails are in their lowest position, or being pivotable about one of their ends and placed in an oblique position for taking up the fork lift truck. In both cases hydraulic means, such as pistons and cylinders which are driven by a hand pump of by a small motor pump, may be present for moving the rails. Also it is possible for the rails to be moved by mechanical means.

The suspension under the lorry or semi-trailer or trailer is possible at an location, which is a great advantage compared with other constructions (such as e.g. on the rear of the lorry), viz. the weight of the fork lift truck is distributed as advantageously as possible over the front and rear wheels of the vehicle.

The invention will now be explained with reference to a description and drawing of an embodiment. In the drawing.

Figure 1:
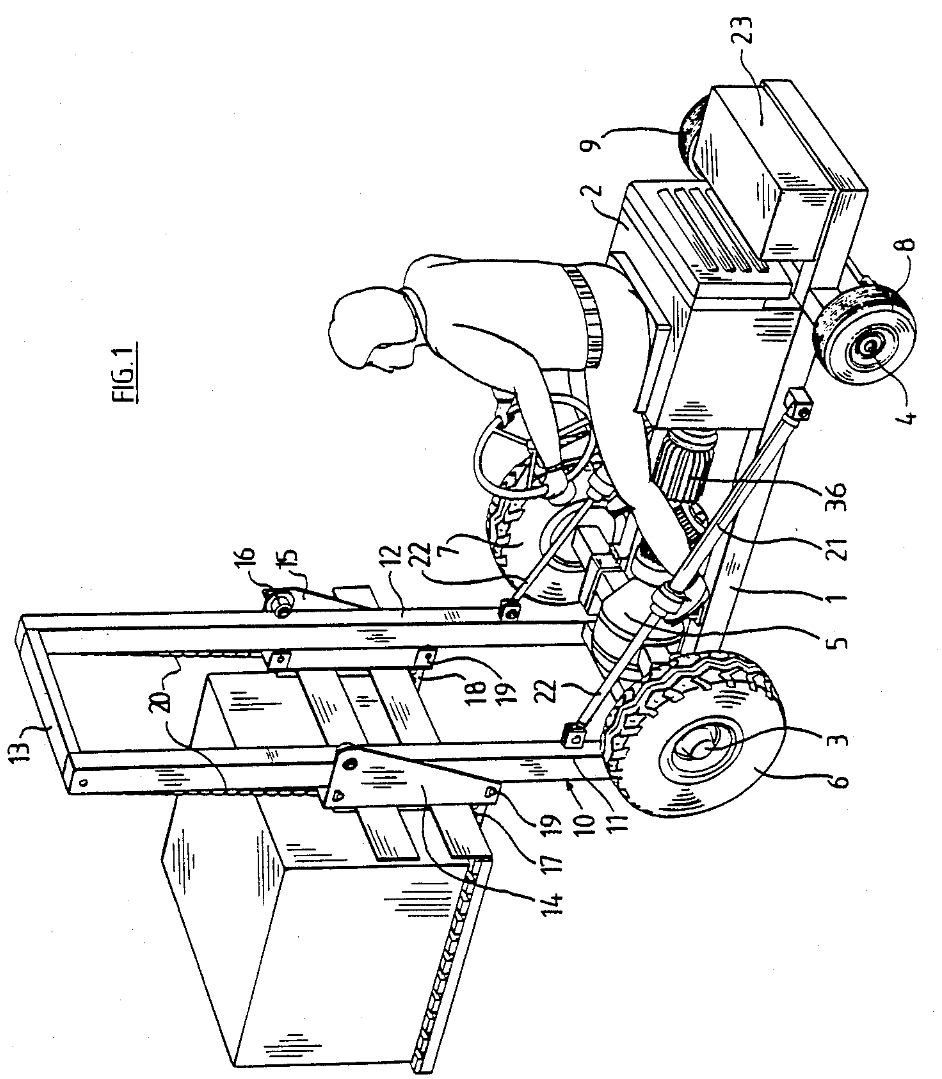
FIG. 1 is a diagrammatic illustration of a fork lift truck according to the invention.

As is illustrated in FIG. 1 the fork lift truck according to the invention comprises a chassis 1 on which an engine with encasing 2 is provided and to which a front axle 3 and a rear axle 4 are provided. The engine drives the front wheels 6 and 7 via a differential 5. On the axle 4 there are provided the wheels 8 and 9 which are smaller than the wheels 6 and 7.

Pivotally connected to the front side of the chassis 1 is the portal 10 which consists of a pair of columns 11 and 12 and a transverse connecting member 13.

Said portal is dimensioned such that when folded backwards it will rest on the chassis 1 and then surround the parts present on the chassis. The two columns 11 and 12 have a tubular section. A pair of guiding means 14 and 15 are led along the front and rear sides of said columns by means of rollers 16. Pivotally connected to the bottom sides of said means 14 and 15 are the legs 17 and 18 of the fork (pivots 19). The legs 17 and 18 are collapsible toward the columns 11 and 12 relative to said columns. Present in the columns 11 and 12 are finally the means 20 for moving the guiding means 14 and 15, and therewith the legs 17 and 18 of the fork, along said columns.

Said means 20 for the vertical adjustment are driven by hydraulic means (not shown). A pair of cylinders 21 and pistons 22 are provided for folding the portal 10.

This hydraulic system for moving the portal 10 also makes it possible to give the portal a forward or backward inclination and to adjust the position of the fork hereby so that it remains horizontal.

Figure 4:
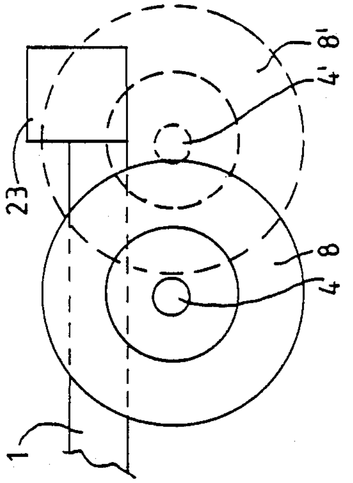
FIG. 4 is a detail of the chassis, provided with adjustable rear wheels.
Figure 3:
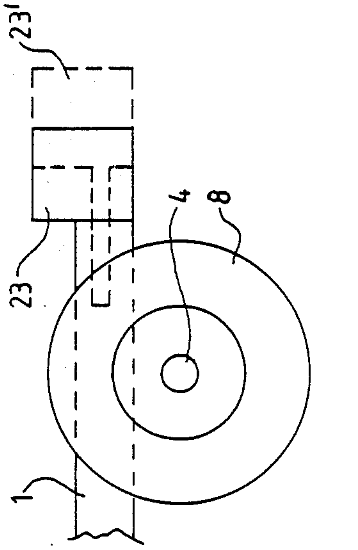
FIG. 3 is a detail of the chassis, provided with an adjustable counterweight.

A counterweight 23 is provided on the chassis 1, outside the wheelbase, at the end of the chassis located opposite the portal 10. As the length of the fork lift truck is limited owing to the limited width of the vehicle it is advantageous to make the counterweight 23 slidable (to a position indicated by 23' in FIG. 3). For the same reason the rear axle 4 may be constructed displaceably (as indicated by 4' and 8' in FIG. 4). These measures add to the stability of the truck.

Figure 2:
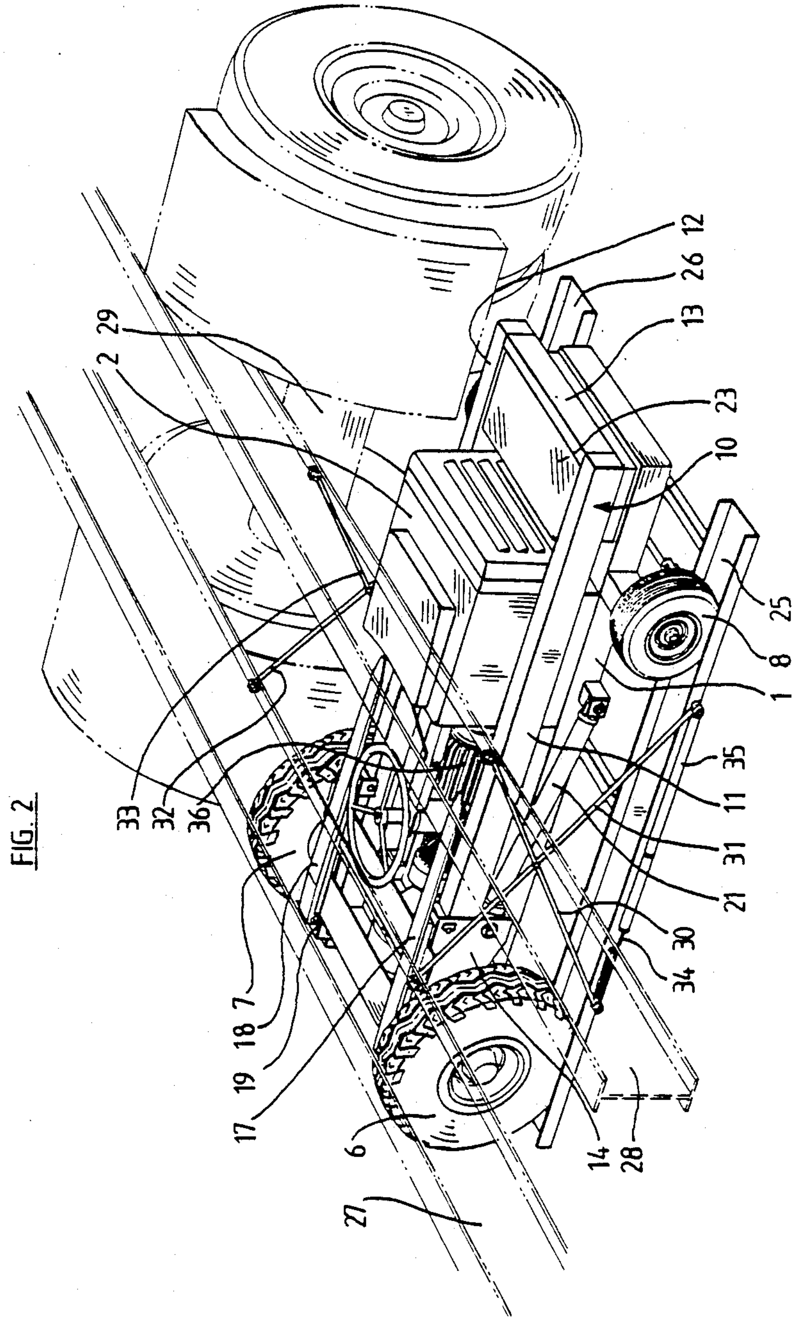
FIG. 2 is also a diagrammatic illustration of said truck in folded condition placed under the cargo space of a trailer.

In FIG. 2 the fork lift truck is illustrated placed in folded condition between the front axle and the rear axle(s) of a vehicle. The portal 10 is in this situation located above and parallel to the chassis 1 and thereby surrounds the engine 2 and the counterweight 23. The two legs 17 and 18 of the fork are located on and parallel to the portal columns 11 and 12. The truck is placed in rails 25 and 26 which hang from chassis beams 27 and 28 of the lorry. Said beams are located under the loading floor, not shown. Said chassis is supported by a front axle 29 and one or more rear axles which are not shown. The fork lift truck can be transported between said axles, therefore.

The rails 25 and 26 can move vertically by means of a hydraulic system consisting of connecting rods 30, 31 and 32, 33 respectively, piston rods 34 and pistons 35. The rails 25 and 26 are suspended from the beams 27 and 28 by means of the connecting rods. It is also possible to connect the rails 25 and 26 pivotally to either of the beams 27 or 28. Placing the truck in the room will be slightly more difficult in that case, however.

An embodiment of the fork lift truck according to the invention is constructed such that the portal is pivotally connected to the chassis, so that in folded condition it can be put into a horizontal position, whereby the fork points vertically upwards in the folded position and lies along the side of the vehicle during transport. According to the invention the fork may be constructed detachably thereby, so that it can be disconnected from the portal for transport and be stowed away in a suitable room provided under the vehicle for that purpose.

Also it is possible for a hyraulic drive (a hydraulic motor) to be present between the engine and the differential. The hydraulic means 30, 31, and 32, 33, 34, 35 respectively can be connected to the hydraulic pump 36 of the fork lift truck.

Summarizing, the fork lift truck according to the invention offers the following advantages:

a low deadweight i.a. as the result of the system of a slidable counterweight.

sideways displacement of forks is not necessary (as with certain fork lift trucks); the fork lift truck can be placed on a truck at any position for loading and unloading.

a compact construction and a small mounting height;

good traction on badly passable terrains adaptable to every chassis mounting is not restricted to a certain place.

I claim:

1. Fork lift truck comprising a chassis, a front and a rear axle supported by the chassis and having wheels at their outer ends, a portal which is pivotally connected to the front of the chassis, a fork on which a load can be placed, being movable along said portal, an engine which is provided on the chassis for driving wheels of the fork lift truck, said truck being intended for being transported under the loading floor of a vehicle intended for goods carriage, characterized in that a counterweight (23) is provided outside the wheelbase at the end of the chassis (1) located opposite the portal (10) and the portal is pivotally connected to the chassis in such a manner that the portal can be folded down so as embrace the engine (2) and the counterweight (23), against the upper side of the chassis.

2. Fork lift truck according to claim 1, characterized in that the counterweight (23) is adjustable in a plane parallel to the chassis (1).

3. Fork lift truck according to claims 1 or 2, characterized in that during transport by the vehicle in folded condition of the portal (10), the lift fork is located along the side of the vehicle.

4. Fork lift truck according to claims 1 or 2, characterized in that the lift fork of the portal is detachable.

5. Fork lift truck according to any one of the claims 1 or 2, characterized in that the front axle (3) of the fork lift truck is driven by the engine (2) and that the diameter of the wheels (6) mounted on the front axle is larger than the diameter of the wheels (8) mounted on the rear axle.

6. Fork lift truck according to any one of the claims 4, characterized in that the non-driven rear axle (4) is adjustable parallel to itself.

7. Vehicle for goods carriage, arranged for transport of a fork lift truck according to claims 1 or 2 including a space being present under the loading floor, in which the fork lift truck can be transported in folded condition, characterized in that said space is provided with rails (25, 26) extending transversely to the longitudinal direction of the vehicle, in which rails the wheels (6, 7, 8, 9) of the fork lift truck can be guided.

8. Vehicle according to claim 7, characterized in that the rails (25, 26) are vertically adjustable so that the fork lift truck can be taken up when the rails (25, 26) are in their lowest position.

9. Vehicle according to claim 7, characterized in that the rails (25, 26) can pivot about one of their ends and can be put in an oblique position for taking up the fork lift truck.

10. Vehicle according to claim 9, characterized in that the rails are movable by means of hydraulic means (30, 31 and 32, 33, 34, 35 respectively).

11. Vehicle for goods carriage, arranged for transport of a fork lift truck comprising a chassis, a front and a rear axle supported by the chassis and having wheels at their outer ends, a portal which is pivotally connected to the front of the chassis, a fork, on which a load can be placed, being movable along said portal, an engine which is provided on the chassis for driving wheels of the fork lift truck, said truck being intended for being transported under the loading floor of the vehicle, a counterweight (23) located outside the wheelbase at the end of the chassis (1) opposite the portal (10) said portal being pivotally connected to the chassis in such a manner that the portal can be folded down, over the engine (2) and the counterweight (23), against the upper side of the chassis, said vehicle including a space under the loading floor in which the fork lift truck can be transported in folded condition, characterized in that said space is provided with rails (25, 26) extending transversely to the longitudinal direction of the vehicle, in which rails the wheels (6, 7, 8, 9) of the fork lift truck can be guided, said rails being pivotable about one of their ends into an oblique position for taking up the fork lift truck and further characterized in that the rails are movable by means of hydraulic means (30, 31 and 32, 33, 34, 35 respectively) and in that the hydraulic means (30, 31 and 32, 33, 34, 33, 34, 35 respectively) can be connected to the hydraulic pump (36) of the fork lift truck by means of a quick connect coupling.

12. Fork lift truck comprising a chassis, a front and a rear axle supported by the chassis and having wheels at their outer ends, a portal which is pivotally connected to the front of the chassis, a fork, on which a load can be placed, being movable along said portal, an engine which is provided on the chassis for driving wheels of the fork lift truck, said truck being intended for being transported under the loading floor of a vehicle intended for goods carriage, a counterweight (23) being provided outside the wheelbase at the end of the chassis (1) located opposite the portal (10), the portal being pivotally connected to the chassis in such a manner that the portal while folded in a down position against the upper side of the chassis, embraces the engine (2) and the counterweight (23).

13. Fork lift truck comprising a chassis, a front and a rear axle supported by the chassis and having wheels at their outer ends, a portal which is pivotally connected to the front of the chassis, said portal having an outer frame defining an open center, a fork, on which a load can be placed, being movable along said portal, an engine which is provided on the chassis for driving wheels of the fork lift truck, said truck, exclusive of said portal and fork, having a predetermined height and being intended for being transported under the loading floor of a vehicle intended for goods carriage, a counterweight (23) being provided rearwardly of the wheelbase at the end of the chassis (1) located outside the portal (10), the portal being pivotally connected to the chassis for movement from a vertical position at the front of the truck to a folded position below the height of the truck, with the frame thereof extending along the sides of the truck, engine and counterweight and across the chassis at a location to the rear of the counterweight to enclose the engine (2) and counterweight (23).

14. Fork lift truck according to claim 13 characterized in that the counterweight (23) is adjustable from a first retracted position to a second extended position further rearwardly of the wheelbase and the frame of the portal (1) extends across the chassis immediately to the rear of the counterweight when the counterweight is in its first retracted position.

* * * * *

UNITED STATES PATENT AND TRADEMARK OFFICE

CERTIFICATE OF CORRECTION

PATENT NO. : 4,859,133

DATED : August 22, 1989

INVENTOR(S) : Jozef G.M. van Leek

It is certified that error appears in the above-identified patent and that said Letters Patent is hereby corrected as shown below:

On the title page

Change inventor's name from "Jozef G. Maria" to

--Jozef G.M. van Leek--.

Signed and Sealed this

Ninth Day of October, 1990

Attest:

HARRY F. MANBECK, JR.

*Attesting Officer*

*Commissioner of Patents and Trademarks*

UNITED STATES PATENT AND TRADEMARK OFFICE

CERTIFICATE OF CORRECTION

PATENT NO. : 4,859,133

DATED : August 22, 1989

INVENTOR(S) : Josef G.M. van Leek

It is certified that error appears in the above-identified patent and that said Letters Patent is hereby corrected as shown below:

Claim 13, column 6, line 9, change "outside" to --opposite--.

Signed and Sealed this

Twentieth Day of November, 1990

*Attest:*

HARRY F. MANBECK, JR.

*Attesting Officer* *Commissioner of Patents and Trademarks*